Nov. 3, 1959  W. S. EDSALL  2,911,502
COMBINED CIRCUIT INTERRUPTERS AND FUSES
Filed Nov. 23, 1954  4 Sheets-Sheet 1

Inventor:
William S. Edsall,
by [signature] Attorney

Nov. 3, 1959 W. S. EDSALL 2,911,502
COMBINED CIRCUIT INTERRUPTERS AND FUSES
Filed Nov. 23, 1954 4 Sheets-Sheet 3

Nov. 3, 1959 W. S. EDSALL 2,911,502
COMBINED CIRCUIT INTERRUPTERS AND FUSES
Filed Nov. 23, 1954 4 Sheets-Sheet 4

United States Patent Office 2,911,502
Patented Nov. 3, 1959

2,911,502

COMBINED CIRCUIT INTERRUPTERS AND FUSES

William S. Edsall, Boston, Mass., assignor to The Chase-Shawmut Company, Newburyport, Mass.

Application November 23, 1954, Serial No. 470,629

10 Claims. (Cl. 200—114)

This invention refers to protective devices and more particularly to devices for protecting electric circuits against overload currents and short-circuit currents.

Protection against overload currents and short-circuit currents may be provided either by fuses, or by automatic circuit interrupters comprising a pair of separable and reclosable contacts. Such circuit interrupters are generally referred to as circuit breakers if their interrupting capacity is sufficiently high to interrupt major fault currents or currents of short-circuit current proportions.

The prime cost of protection of electric distribution systems by fuses are considerably lower than the prime cost of system protection by circuit breakers, yet the operating cost of an electric system which is protected only by fuses are relatively high if blowing of fuses on account of relatively small protracted overloads occurs relatively frequently. Generally the operating cost of an electric distribution system which is protected by circuit breakers are relatively lower if the occurrence of overloads calls for relatively frequent temporary interruptions of electric circuits followed by reclosing thereof when the danger of excessive heating of any part associated with the circuit has been removed.

In electric distribution circuits the occurrence of protracted overloads tends to be relatively frequent, but the occurrence of fault currents of short-circuit current proportions infrequent. Under such conditions combined protection of electric distribution circuits by fuses and serially connected automatic circuit interrupters is generally indicated. In such applications use is preferably made of fuses of the current-limiting type designed to blow only on the occurrence of major fault currents, the automatic circuit interrupter providing the required protection against the more frequent protracted overload conditions.

The prime cost of the above combined system of protection by current-limiting fuses and automatic circuit interrupters can be kept to a minimum where provision of an automatic circuit interrupter of relatively limited interrupting capacity appears to be acceptable.

Since restoring service by reclosing an automatic circuit interrupter upon occurrence of a temporary inadmissible overload does not involve any expense and since replacing of a blown current-limiting fuse upon occurrence of a major fault is generally an infrequent event, the operating cost of a system of combined protection by current-limiting fuses and automatic circuit interrupters tend to be relatively small.

In numerous existing installations wherein circuit protection is predicated on National Electrical Code or NEC fuses only, the space available is generally not sufficient to permit a conversion to the more economical system of combined protection by current-limiting fuses and serially connected automatic circuit interrupters.

It is, therefore, one object of this invention to provide a protective device which combines the advantages of protection by current-limiting fuses and by automatic circuit interrupters, yet is adapted to be accommodated in places where there are severe space limitations such as, for instance, existing installations wherein circuit protection had heretofore been predicated solely on National Electrical Code fuses.

Another object of the invention is to provide an improved integrated unit comprising a thermally responsive automatic circuit interrupter and one or more current-limiting back-up fuses which unit is extremely compact and is simple, and inexpensive to manufacture, and reliable in operation.

Another object of this invention is to provide a compact automatic circuit interrupter adapted to be tripped by a bimetal strip on the occurrence of relatively small protracted overloads, and by a striker pin under the control of a current-limiting fuse on the occurrence of major fault currents, wherein both tripping operations require relatively small tripping forces limited to overcoming latch friction.

Another object of the invention is to provide an automatic circuit interrupter combined with one or more current-limiting fuses to jointly form a compact self-sustained structural unit the compactness of which is predicated upon recent progress in the design of current-limiting fuses, as the teachings set forth in United States Patent 2,653,203 to Frederick J. Kozacka, September 22, 1953, Current-Limiting Fuse.

Another object of the invention is to provide a composite protective device of the aforementioned kind adapted to be readily associated with installations originally designed for circuit protection by National Electrical Code fuses, the application of which device does not require any structural changes of the installation as such, i.e. of the bus bars and the connector elements thereof.

It is known to house a so-called molded case circuit breaker and a set of back-up fuses for the circuit breaker in a common housing or cabinet. While such arrangements are quite satisfactory from the viewpoint of operation, their application is precluded in many instances by their relative bulk. It is, therefore, another object of the invention to provide circuit-breaker and back-up fuse combinations which, while performing the same function as the above prior art combinations, are more compact, the current-limiting fuse being built into the circuit breaker housing instead of the fuse and the circuit breaker with its separate housing being built into a common housing or cabinet.

A further object of the invention is to provide a protective device capable of interrupting relatively high fault currents by fusible means and of interrupting protracted overload currents by separation of a pair of cooperating contacts permitting relatively rapid reclosing upon separation thereof, which device is very compact in spite of the fact that in it different interrupting tasks are assigned to different interrupting mechanisms, e.g. as compact as National Electrical Code fuses having the same current and voltage rating but a much smaller interrupting capacity.

The table below indicates the available space versus required capacities of National Electrical Code fuses of standard dimensions.

| Voltage Rating | Current Rating | Kva. | Internal volume, in.³ | Kva. per in.³ |
|---|---|---|---|---|
| 250 | 30 | 7.5 | .20 | 37.5 |
|  | 60 | 15 | .70 | 21.4 |
|  | 100 | 25 | 1.71 | 14.6 |
|  | 200 | 50 | 4.39 | 11.4 |
| 600 | 30 | 18 | 1.31 | 13.7 |
|  | 60 | 36 | 2.52 | 14.3 |
|  | 100 | 60 | 2.82 | 21.2 |
|  | 200 | 120 | 7.76 | 15.5 |

It has been possible to drastically reduce the dimensions of modern current-limiting fuses compared to those of National Electrical Code fuses having the same voltage rating and the same current rating, and my invention is predicated upon recent advances in size reduction of current-limiting fuses.

I have found that the drastic size reduction of current-limiting fuses recently achieved enables to accommodate within the space normally required for a National Electrical Code fuse having a given voltage rating and a given current rating both an automatic circuit interrupter having separable and reclosable contacts and a current-limiting back-up fuse for the circuit interrupter, each of the two devices having the same voltage rating and current rating as the National Electrical Code fuse. In such an arrangement the current-limiting back-up fuse is designed to interrupt only severe fault currents, leaving it to the circuit interrupter to interrupt load and overload currents. The circuit interrupter may be designed to interrupt only load and overload currents, i.e. it may lack the interrupting capacity required for interrupting severe fault currents, and therefore be of a relatively simple and compact design. If a combination of an automatic circuit interrupter and of a current-limiting fuse both having given voltage and current ratings is provided with a pair of blade contacts having the same size and the same geometrical configuration as the blade contacts of a National Electrical Code fuse having the same voltage and current ratings, the aforementioned combination may be readily substituted in existing installations of National Electrical Code fuses for installed National Electrical Code fuses without requiring any structural changes whatever. All that is needed to obtain improved protection is insertion, into the fuse holders of the installation, of the blade contacts of the automatic circuit-interrupter-current-limiting-fuse unit.

Further objects, advantages and features of the invention will become apparent as the following description proceeds, and the features of novelty which characterize the invention will be pointed out with particularity in the claims annexed to, and forming part of, this specification.

For a better understanding of the invention reference may be had to the accompanying drawings in which.

Figures 1, 8:
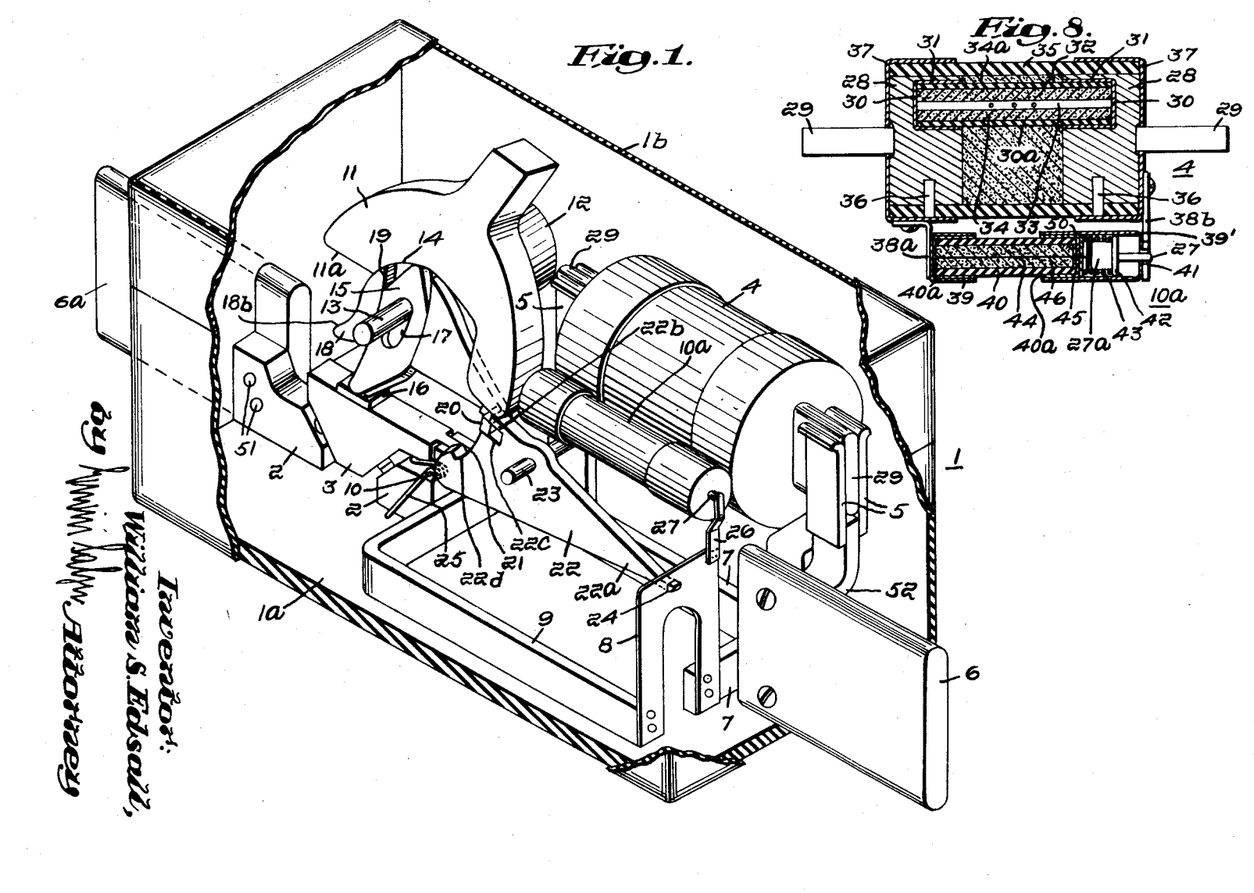
Fig. 1 shows in perspective in diagrammatic fashion an automatic overload responsive switch and a current-limiting back-up fuse therefor supported by a joint frame structure of insulating material.
Fig. 8 is a longitudinal section through the current-limiting fuse and the striker pin device forming an integral part of the structure shown in Figs. 2 to 7, inclusive.

Referring now to the drawings, and more particularly to Figs. 1 to 8, reference numeral 1 has been applied to indicate in a general way a housing or casing enclosing a thermally responsive automatic switch comprising the stationary contacts 2 and the movable contact 3 and a current-limiting fuse 4. Casing 1 comprises a substantially rectangular mounting block, or frame structure, which is covered by a hood, or cover. Fuse 4 is supported by fuse holders or fuse clips 5. Blade contact 6 projecting away from housing 1 is conductively connected to one of the fuse holders 5. The other fuse holder 5 is conductively connected to a conducting bar 7 to which, in turn, one end of the substantially U-shaped bimetallic element 8 is conductively connected. The other end of bimetallic element 8 is conductively connected to the conducting bar 9 to which one of the fixed contacts 2 is attached. Movable contact 3 is pivoted at 10 to one of the fixed contacts 2 and spring-biased by means of rat-trap spring 25 to the open position thereof. The left fixed contact 2, as seen in Fig. 1, is conductively connected to a blade contact 6a projecting from housing 1 in a direction opposite to that of blade contact 6.

The circuit through the protective device shown in Figs. 1 to 8 is as follows: Blade contact 6, right fuse holder 5, current-limiting fuse 4, left fuse holder 5, conducting bar 7, bimetal element 8, conducting bar 9, one of the fixed contacts 2, movable contact 3, the other of the fixed contacts 2, blade contacts 6a. The current-path through the current-limiting fuse 4 is shunted by the current-path through the striker pin device 10a which is supported by the current-limiting fuse 4. The resistance of the current-path through the striker pin device 10a is very high compared to the resistance of the current-path through the current-limiting fuse 4. As a result, a negligibly small current will flow through the striker pin device 10a as long as the current-limiting fuse 4 is intact.

The operating mechanism for the movable contact 3 comprises a handle member 11, preferably of molded insulating material. Hub member 12 forms an integral part of handle member 11 and is pivotally supported by pin 13. The side of handle member 11 juxtaposed to movable contact 3 forms a cam surface 14 engaging the cam element 15 preferably made of metal as, for instance, by a powder metallurgical process. Cam element 15 rests with the lower end thereof on an insulating element or bar 16 supported by movable contact 3 on the back thereof. Cam element 15 is provided with an oblong hole 17 through which handle-supporting pin 13 projects. Latch lever 18 pivotally mounted on pin 13 is provided with a groove 19 having substantially the shape of a portion of a circle. Groove 19 accommodates cam element 15 which is circularly shaped to fit into the groove. Latch lever 18 is provided with an extension 20 adapted to cooperate with cam surface 21 on a second latch lever 22. The second latch lever 22 is pivoted at 23 by means of a suitable pin. The end 22a of latch lever 22 remote from the point where it is pivotally supported engages a cut out portion 24 in bimetal strip 8 and is normally held in position by that cut out portion.

In the closed position of the switch or circuit interrupter, i.e. when contact 3 engages contacts 2, a component of the force of spring 25 is transmitted by cam element 15 upwardly and tends to rotate latch lever 18 in clockwise direction, as seen in Figs. 1 to 4, inclusive, about pin 13 on which it is supported. Latch lever 18 engages an abutment surface 22c forming part of cam surface 21 on latch element 22 and transmits a component of the force which acts on it upon latch lever 22. As a result, latch lever 22 tends to rotate counterclockwise—as seen in Figs. 1 to 4—about its pivot pin 23, but is normally restrained from so doing by bimetal strip 8. It will be noted that the arm of latch lever 22 acted upon by extension 20 of lever 18 is relatively short and that the arm of latch lever 22 engaging bimetal strip 8 is relatively long. This reduces the component of the spring force acting upon contact 3 transmitted to bimetal strip 8 by levers 18 and 22. Bimetal strip 8 is stressed in a direction longitudinally thereof by the force transmitted to it by means of latch lever 22, i.e. the force transmitted to bimetal strip 8 by latch lever 22 extends in the plane of bimetal strip 8, which is thus free from any bending force or bending action whatever.

If the operating handle 11 is being turned in counterclockwise direction, as seen in Figs. 1 to 4, inclusive, the cam surface 14 of the handle 11 permits cam element 15 to move in a direction away from fixed contacts 2. This movement is made possible on account of the oblong hole 17 provided in cam element 15. It will be apparent that pin 13 engages the upper end of oblong hole 17 when the switch or circuit interrupter is in the closed position thereof, Fig. 2, and that pin 13 engages the lower end of oblong hole 17 upon movement of handle 11 to the off position, Fig. 3. The above described closing operation has no effect whatever on latch levers 18 and 22. Raising of cam element 15 permits parting of movable contact 3 from the stationary contacts 2, resulting in interruption of the circuit at breaks formed between contacts 2, 3. Rotation of the handle 11 in clockwise direction, as seen in Figs. 1 to 4, causes the cam surface 14 of the handle to depress the cam element 15 against the bias of spring 25, resulting in engagement of contacts 2 by contact 3 and reclosing of the circuit through the device.

Handle 11 is provided with an abutment or cam surface 11a adapted to cooperate with an abutment surface 18b on lever 18, as will be shown hereinafter.

Bimetal strip 8 is provided at one corner thereof with a tab 26 intended to be acted upon by the striker pin 27 of striker pin device 10a. The structure of the current-limiting fuse 4 and of the striker pin device 10a associated with it are best shown in Fig. 8 in reference to which these parts will now be described.

The current-limiting fuse 4 is made up of the spaced terminal blocks 28 which are preferably made of copper. A pair of blade contacts 29 adapted for insertion into clips 5 (see Figs. 1-4) extends away from terminal blocks 28. Each terminal block 28 is provided with one or more recesses 30 at juxtaposed sides thereof and current-limiting cartridge fuses 30a are arranged in registering pairs of recesses 30, of which but one has been shown in Fig. 8. The cartridge fuses 30a comprise a pair of terminal caps 31 mounted on a casing 32 and conductively interconnected by a link 33 surrounded by a pulverulent arc-quenching filler 34, such as quartz sand. The terminal caps 31 are inserted into recesses 30 under considerable pressure to minimize the voltage drop occurring at these points of current transfer. A casing 35 of insulating material surrounds all the cartridge fuses 30a which may be arranged between terminal blocks 28. The space outside the individual casings 32 and inside the common casing 35 is preferably filled with a pulverulent arc-quenching filler 34a serving as standby in case that one of the cartridge fuses within casing 35 should fail, resulting in the exhaust of hot ionized products of arcing into the intercasing space. Casing 35 and terminal blocks 28 are held in position by means of transverse steel pins 36 and a ferrule 37 of brass or a similar metal is arranged at each end of casing 35. A bracket of a material having a high conductivity, such as brass, is attached to each ferrule 37. The left bracket 38a supports a ferrule 39 and the right bracket 38b supports a ferrule 39'. Tubular casing 40 is provided with two ferrules 40a which are inserted into the ferrules 39 and 39'. The right bracket 38b and the right ferrule 39' have a bore 41, and striker pin 27 is arranged coaxially with respect to that bore. The axially inner portion 27a of striker pin 27 has a larger diameter than the axially outer portion thereof and is provided with a collar 42. Helical spring 43 rests with one end on collar 42 and with the other end on right ferrule 40a. Normally striker pin 27 is held in the position shown by virtue of a high resistance wire 44 such as, for instance, a piano wire, of which one end is attached to the left ferrule 40a and the other end to the wide portion 27a of the striker pin 27. In order to make it possible to attach wire 44 to striker pin 27, the right ferrule 40a is provided with a fine bore 50 just sufficiently large to enable the passage of wire 44, i.e. permitting wire 44 to be threaded through it. A seal 45 perforated for the passage of wire 44 is arranged within casing 40 immediately adjacent the right end thereof and precludes the escape of hot and ionized products of arcing through the hole or bore 50 in right ferrule 40a. Preferably the space within casing 40 is filled with a pulverulent arc-quenching filler 46 to absorb the energy of the arc formed upon fusion of wire 44.

The operation of the device will now be described with reference to Figs. 1 to 8.

Figure 2:
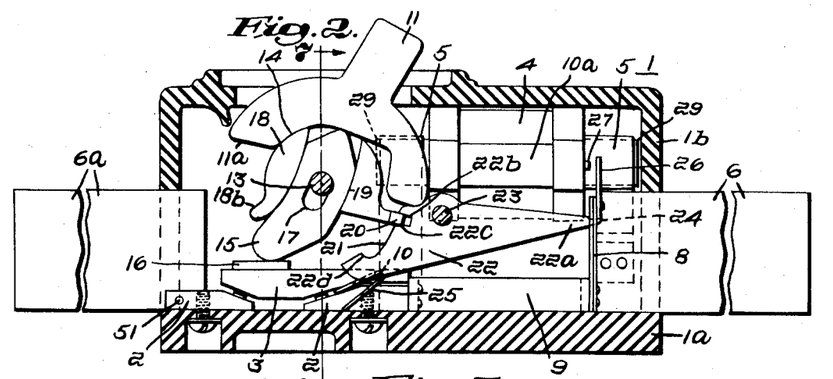
Fig. 2 is a side elevation of, and in part a longitudinal section through, a structure generally similar to that shown in Fig. 1 with the contacts of the switch and their operating mechanism in closed position.

Assuming occurrence of an overload of relatively small magnitude but inadmissible duration; in that instance the bimetal strip 8 will gradually bend toward the right and finally release latch lever 22. As a result, latch lever 22 is free to rotate, and rotates, in counterclockwise direction about pin 23. Simultaneously latch lever 18 rotates about its supporting pin 13 in clockwise direction, spring 25 providing the torque for the motion of both latch levers 18 and 22, and lever 22 being driven by lever 18 by virtue of the engagement of cam surface 22c of lever 22 by the extension 20 of lever 18. Upon release of latch levers 22 and 18 the movable contact member 3 and the insulating strip 16 on its back are free to push the cam element 15 in upward direction. Cam element 15 is free to travel upwardly until pin 13 abuts against the lower end of the oblong hole 17 in cam element 15. As shown in Fig. 2, the upper end of cam element 15 which, in the closed position of the automatic switch or circuit interrupter, is in engagement with cam surface 14 of handle 11 is situated slightly to the right of pivot 13. The force of spring 25 imparted to handle 11 by cam element 15 thus tends to rotate handle 11 about pin 13 in a counterclockwise direction. Since the upper end of cam element 15 is only slightly off center, the force imparted by cam element 15 to handle 11 is normally not sufficient to overcome the friction between the hub portion 12 of handle 11 and pin 13. Upon clockwise rotation of latch lever 18 on account of warping of bimetal strip 8 to the right, the upper end of cam element 15 engaging handle 11 is moved to the right, resulting in a substantial increase of the leverage of cam element 15, and now the component of the force of spring 25 transmitted by cam element 15 to handle 11 is sufficiently large to overcome the friction between hub portion 12 of handle 11 and pin 13. This results in a counterclockwise rotation of handle 11 to the reset position thereof shown in Fig. 4 which is an intermediate position between the on and the off position of handle 11.

Assuming now that a major fault occurs, resulting in a fault current which may well be above the interrupting capacity of the automatic switch or circuit interrupter. Such a current will cause fusion and vaporization of the links in the current-limiting cartridge fuses 30a of which the current-limiting fuse 4 is made up. Fusion will occur so rapidly that a substantial arc resistance will develop before the fault current can rise to the peak of the short-circuit current which is available at the point of the electric system where the protective device is located. In accordance with the operating characteristics of current-limiting fuses the current will generally decay to zero before, or at the time, of the first natural current zero following fault inception. As the arc voltage increases across the terminal blocks 28 of the current-limiting fuse 4, a current proportional to the arc resistance will flow through the wire 44 of the striker pin device 10a shunting current-limiting fuse 4. Ultimate fusion of wire 44, resulting from this flow of current through it, releases striker pin 27, which is then impelled by the action of spring 43 against the tab 26 on bimetal strip 8. Thus bimetal strip 8 is slightly bent to the right, as seen in Fig. 1, as if an overload of small magnitude but excessive duration had occurred. Hence latch levers 22 and 18 are allowed to move under the action of spring 25 in the same fashion as if an overload of excessive duration had occurred. Consequently contact 3 is allowed to separate from contacts 2 under the action of spring 25, and in so doing to raise cam element 15 and to cause counterclockwise rotation of handle 11 to the reset position thereof. Thus the handle 11 indicates upon operation of the automatic switch or circuit interrupter, either on accouna of an overload of inadmissible duration, or on account of a major fault current causing blowing of the current-limiting fuse 4, that the automatic switch or circuit interrupter is in the open position.

Figure 3:
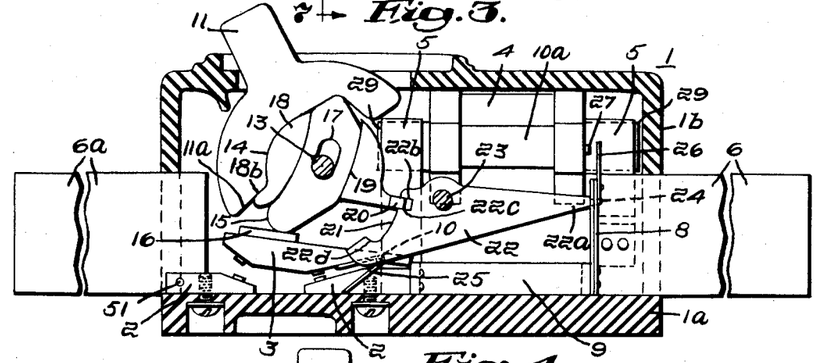
Fig. 3 is a view similar to that of Fig. 2 showing the same structure as Fig. 2 with the contacts of the switch and their operating mechanism in the open position.
Figure 4:
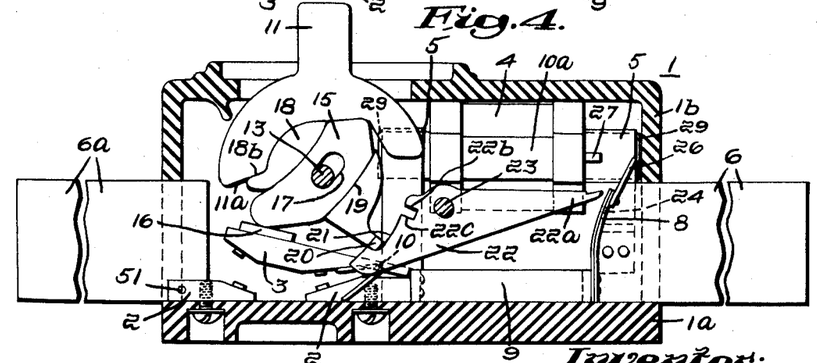
Fig. 4 is a view similar to that of Fig. 2 showing the same structure as Fig. 2 with the contacts of the switch and their operating mechanism in a position resulting from automatic tripping of the switch.
Figure 5:
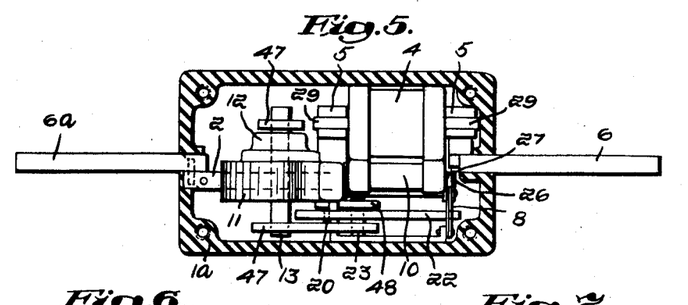
Fig. 5 is a top plan view on a smaller scale of the structure shown in Fig. 2.
Figure 6:
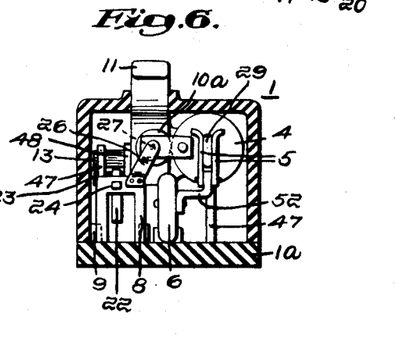
Fig. 6 is in part a cross-section and in part an end view, on a smaller scale than Fig. 2, of the structure shown in Fig. 2.
Figure 7:
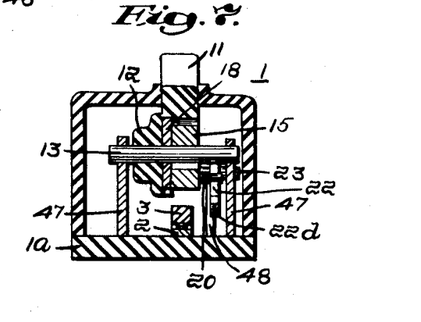
Fig. 7 shows some details of the operating mechanism in a transverse section along 7—7 of Fig. 2, the scale being the same as in Figs. 5 and 6.

This arrangement makes it also possible to determine readily whether operation of the automatic switch or circuit interrupter, i.e. parting of the contacts 2 and 3 thereof, is due to a protracted overload, or to the occurrence of a current of short-circuit current proportions causing blowing of the current-limiting fuse 4. Upon occurrence of a fault current of short-circuit current proportions the spring 43 of the striker pin device 10a exerts permanently a sufficiently high pressure upon tab 26 on bimetal strip 8 to preclude resetting of the switch mechanism and reclosing of the switch. In case of opening of the switch by the action of striker pin device 10a, fuse 4 and striker pin device 10a must be replaced by a new fuse with a striker pin device before the circuit can be restored by closing of the contacts 2, 3. Any attempt to reset the switch and to reclose the switch contacts 2, 3 will be ineffective as long as the striker pin 27 remains biased against tab 26 by the action of striker pin spring 43. If the automatic operation of the switch was caused by an inadmissible overload, bimetallic strip 8 will bend back to its normal position upon cooling thereof, and this enables resetting of the automatic switch or circuit interrupter which is achieved as follows: Handle 11 is turned counterclockwise—as seen in Fig. 4—from the reset position to the off position thereof. This causes a counterclockwise rotation of latching lever 18 by virtue of engagement of the abutment surface 18b thereof by the abutment surface 11a of handle 11. As latching lever 18 rotates counterclockwise, its extension 20 engages the abutment surface 22b of latching lever 22, resulting in clockwise rotation of latching lever 22 about pin 23 until the end 22a of latching lever 22 engages cut out portion 24 of bimetal strip 8, and is thus restrained from further movement by the action thereof. This completes the resetting operation necessary preparatory to reclosing of the switch or circuit interrupter, and enables manual reclosing thereof. To this end, the handle or manual operator 11 is now being turned clockwise, as seen in Figs. 2 to 4, and this causes depression of cam element 15 by the action of cam surface 14 of handle 11 and engagement of contacts 2 by contact 3. The automatic switch or circuit interrupter is then ready for another automatic operation.

Figure 11:
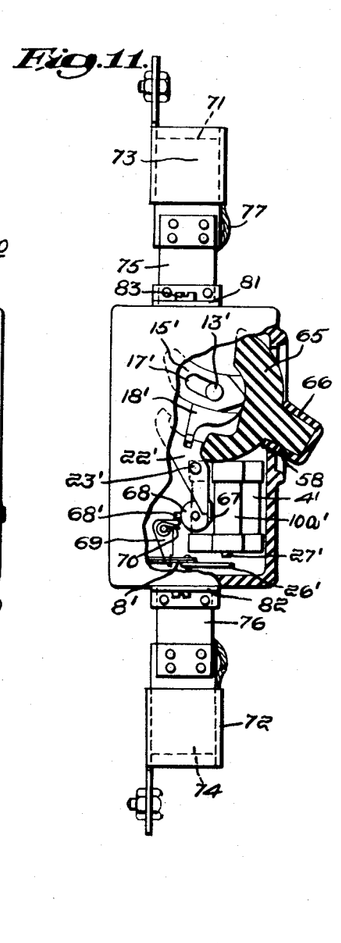
Fig. 11 shows in part in side elevation and in part in longitudinal section one of the pole units of which the structure of Figs. 9 and 10 is made up.

It will be apparent from the foregoing that handle 11 has been adapted to form an overload tripping indicator as well as a blown fuse indicator. If handle 11 is in the intermediate position thereof between the on-position and the off-position, this is an indication that there is a disturbance in the system, i.e. a condition which ought to be investigated. The simplicity and compactness of joint trip and blown fuse indication is mainly due to the fact that the striking tip of striker pin 27 is arranged adjacent to the plane of the U-shaped bimetallic strip 8 substantially at right angles thereto. A modification of this joint overload trip and blown fuse indicator is shown in Fig. 11.

The blade contact 6a is supposed to be inserted into a fuse holder or fuse clip on the supply side of the circuit, and the blade contact 6 is supposed to be inserted into a fuse holder or fuse clip on the load side of the circuit. When contact 3 parts from contacts 2 as a result of the operation of current-limiting fuse 4, the circuit interrupter disconnects the fuse 4 and the fuse holders 5 from the line and thus enables safe replacement of fuse 4, i.e. replacement thereof without danger to the service man of getting in contact with any live part, or parts, of the circuit.

In the embodiment of the invention shown in Figs. 1–8 striker pin 27 strikes against the tab 26 of bimetal strip 8 upon blowing of fuse 4 and fusion of the fusible shunt conductor 44. Upon operation of striker pin device 10a the bimetal strip 8 is permanently maintained out of engagement with latch lever 22 on account of the fact that the spring action inherent in the bimetal strip 8 tending to maintain it in the position shown in Fig. 2 is not as strong as the spring action of helical striker-pin-biasing spring 43 tending to keep bimetal strip 8 out of the path of latch lever 22, thus precluding resetting of the switch or circuit interrupter by operation of handle 11. It is not necessary to achieve this end that the striker pin 27 act directly upon the bimetal strip 8. The bimetal strip 8 is in effect a latch in a trip-free latch mechanism of a circuit interrupter which latch is normally held in position by latch friction and movable out of position against the action of a predetermined spring bias, thereby unlatching the trip-free latch mechanism. Bimetal strip 8 performs also the additional function of sensing, and being responsive to, overload conditions. The striker pin 27 may be arranged to operate any latch in a trip-free latch mechanism which is normally held in position by latch fritcion and movable out of position against the action of a predetermined spring bias, thereby unlatching said latch mechanism, provided that the action of said predetermined spring bias is less than the action of the striker pin spring. This precludes resetting of the latch mechanism by operation of the handle upon operation of the striker pin device, unless the blown fuse and the striker pin device associated with it have been replaced by a new fuse and a new striker pin device.

It will be apparent from the foregoing that the blade contact or connector 6, and the blade contact or connector 6a, are each connected to one of the contacts 2 of the automatic switch or circuit interrupter by separate conductor means. Blade contact or connector 6a and one of the fixed contacts 2 are mechanically and electrically connected by means of a first conductor means or rivets 51. Blade contact or connector 6a and the other of the fixed contacts 2 are conductively connected by a second conductor means which includes bracket 52, fuse holder 5 supported by said bracket, the current-limiting fuse 4, the other fuse holder 5, the other bracket 52, conductor bar 7, bimetal strip 8, and conductor bar 9 to which one of the two contacts 2 is riveted.

The overload responsive tripping means or bimetal strip 8 and the current-limiting fuse 4 are arranged relatively close to each other or, to be more specific, in an area of frame structure 1a bounded on one side by one of contacts 2 and on the other side by connector 6. This spatial relation is important because it permits to transmit the tripping impulse of the striker pin device 10a to the latch mechanism of the automatic switch or circuit interrupter with a minimum of parts, thus greatly contributing to the compactness of the arrangement. The above arrangement of the current-limiting fuse 4 and the way in which it is connected make it possible to use the contacts 2, 3 of the circuit interrupter as disconnect when it becomes necessary to replace the current-limiting fuse upon blowing thereof by another current-limiting fuse of the same kind.

The pins or shafts 13 and 23 may be supported in any desired way, either directly by the frame structure 1a, or by metallic brackets mounted on the frame structure. In the drawing reference numeral 47 has been applied to designate a pair of brackets supporting pin or shaft 13 and reference numeral 48 has been applied to designate a bracket supporting pin or shaft 23 jointly with one of the brackets 47. Brackets 47 and bracket 48 have been omitted in Figs. 1 to 4, for the sake of clarity, but have been clearly shown in Figs. 5 to 8.

The blade contacts 6 projecting from opposite sides of the insulating frame structure 1a are intended to be inserted into any conventional fuse holder designed to receive NEC cartridge fuses. Where it is desired to substitute a plurality of fuses which are inserted into a multiphase circuit it is necessary, or desirable, to resort to an arrangement of the type shown in Figs. 9 to 11. The tripolar unit shown in Figs. 9 to 11 comprises three switch units of the general character shown in Fig. 1. These three switch units have been generally designated by reference numerals 60, 61 and 62. The three handles 63, 64, 65 of switch units 60, 61 and 62 are coupled by a cross-member or cross-bar 66 secured by screws 58 to the handles 63, 64 and 65. Operation of cross-member or cross-bar 66 permits joint opening, joint closing and joint resetting of the three switch units 60, 61 and 62.

Referring now more particularly to Fig. 11 showing in part the internal identical structure of each of the three switch units, it is apparent that this strucure is in substance the same as that shown in Figs. 1 to 8, inclusive, except for one significant difference.

Fig. 11 does not require any explanation inasmuch as the internal structure of the switch unit shown therein is the same as that shown in Figs. 1 to 8, inclusive. It will be apparent from Fig. 11 that latch lever 22' does not engage bimetal strip 8' but is normally restrained in position by a latch 67 forming part of a rotatable trip bar 68. The upward component of the switch opening force transmitted from latch lever 22 to latch 67, i.e. the component from left to right as seen in Fig. 11, passes through the center of rotation of trip bar 68, which normally precludes rotation thereof. Bimetal strip 8' is engaged by a lever 69 tending to rotate in counterclockwise direction, as seen in Fig. 11, under the action of a rat trap spring 70. One arm of lever 69 is adapted to engage an abutment 68' on rotatable trip bar 68. Upon bending of bimetal strip 8' to such an extent as to release lever 69, the latter rotates under the action of rat-trap spring 70. Engagement of abutment 68' by lever 69 causes rotation of trip bar 68 to release latch lever 22'. The latter is now free to rotate about its pivot pin 23', thus permitting opening of the switch structure of the one switch pole under consideration.

The parts 13', 15', 17' and 18' shown in Fig. 11 correspond to the parts 13, 15, 17 and 18 of the structure shown in Figs. 2 to 4. Current-limiting fuse 4' shown in Fig. 11 supports striker pin device 10a' including striker pin 27' adapted to cooperate with tab 26' on bimetal strip 8' to cause opening of the circuit interrupter upon blowing of current-limiting fuse 4.

Figure 9:
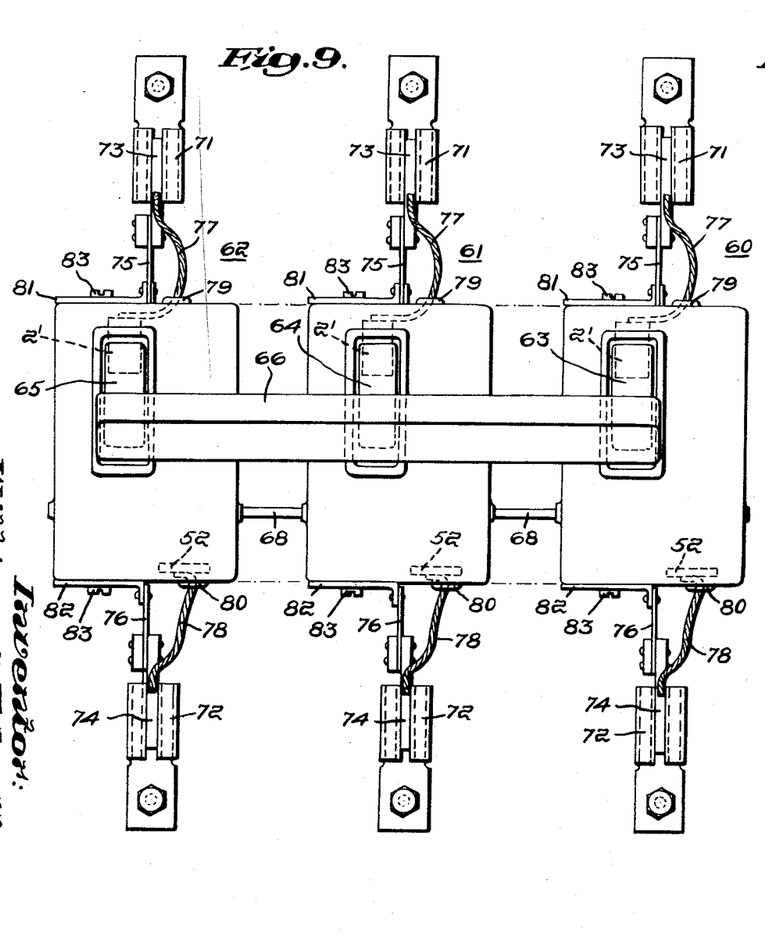
Fig. 9 is a front elevation of a multipolar device embodying the present invention.

The trip bars of the three switch units 60, 61 and 62 are joined or tied together to form a unitary trip bar extending outside of the individual housings of switch units 60, 61 and 62, as clearly shown in Figs. 9 and 11. Consequently, all three switch units 60, 61 and 62 are tripped if the tripping means of only one of the three switch units becomes operative or, in other words, the arrangement is designed to preclude single-phasing.

Each automatic interrupter or automatic switch unit 60, 61, 62 is associated with a pair of fuse holders 71 and 72. Each fuse holder 71, 72 is adapted to cooperate with a blade contact 73 and 74, respectively. Blade contacts 73 are arranged above switch units 60, 61 and 62 and engage fuse holders 71. Blade contacts 74 are arranged below switch units 60, 61 and 62 and engage fuse holders 72. Blade contacts 73 are supported by leaf springs 75 and blade contacts 74 are supported by leaf springs 76. Leaf springs 75 and 76 are in turn supported by brackets 81 and 82 secured to switch units 60, 61 and 62. Leaf springs 75 and 76 enable insertion of blade contacts 73 and 74 into fuse holders 71 and 72 even if the fuse holders are arranged out of registry with switch units 60, 61 and 62. Leaf springs 75 and 76 are mechanical supports for blade contacts 73 and 74 and not intended as current-carrying means. The current flowing through switch units 60, 61 and 62 is carried from and to the fuse holders 71 and 72 by means of braids 77 and 78 which shunt leaf springs 75 and 76. Brackets 81 and 82 supporting leaf springs 75 and 76 are each provided with an adjusting slot 84 (see Fig. 10), into which a clamping screw 83 is inserted. Adjusting slots 84 permit shifting of brackets 81 and 82 with respect to the housings of switch units 60, 61 and 62 in such a manner as to bring blade contacts 73 and 74 in fairly good, though not necessarily perfect, registry with fuse holders 71 and 72. Braids 77 are threaded through bushings 79 and braids 78 are threaded through bushings 80 into the housings of switch units 60, 61 and 62. Braids 77 are conductively connected to one of the fixed contacts 2' of which a pair is arranged in each switch unit 60, 61 and 62 (see Figs. 1 and 9). Braids 78 are conductively connected to one of brackets 52 which supports one of the fuse holders for the current-limiting fuse (see Figs. 1 and 9) in each unit 60, 61, 62.

Figure 10:
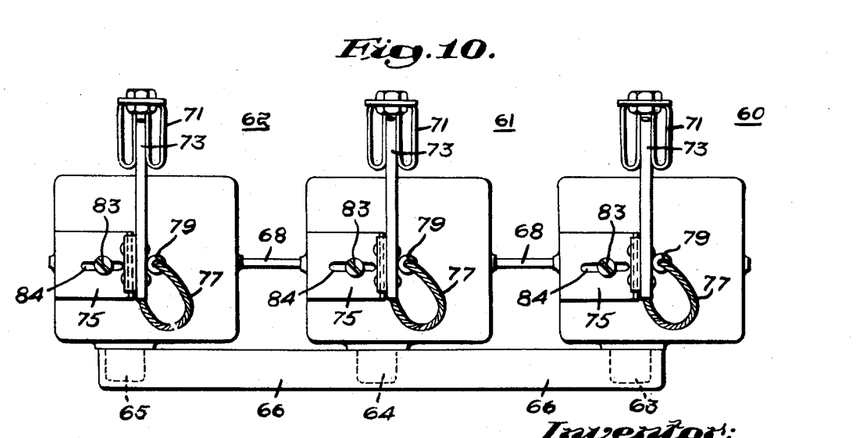
Fig. 10 is a top-plan view of the structure of Fig. 9.

The switch units 60, 61, 62 may be spaced differently for each particular application of the multipolar structure shown in Figs. 9 to 11, in order to align the switch units 60, 61, 62 with a given or pre-existing arrangement of fuse holders. All that is needed in order to space switch units 60, 61 and 62 a predetermined distance is to provide a cross-tie 66 of appropriate length and to couple the portions of trip-bar 68 situated within the housings of units 60, 61 and 62 by external trip-bar coupling elements of appropriate length situated between the housings of units 60, 61 and 62. Any desired kind of coupling means may be used for tying the portions of trip-bar 68 within units 60, 61 and 62 into a trip-bar common to all three switch units 60, 61 and 62.

The blade contacts 73 and 74 have substantially the dimensions and the spatial relation of the blade contacts of an NEC fuse having the same current-carrying capacity or current rating as the automatic switch or circuit interrupter units 60, 61 and 62.

It will be understood that there are applications which do not call for a flexible or adjustable positioning of switch units 60, 61, 62 relative to each other. In such instances a common frame structure of insulating material may be provided to support the three switch units 60, 61, 62 forming a multipolar automatic switch or circuit breaker. Such a common frame structure has been diagrammatically indicated in Fig. 9 by a dash-and-dot line. Where the three switch units, the three current-limiting fuses and the three striker pin devices are mounted on a common frame structure of insulating material, a common hood of insulating material may be provided to cover these three pole units.

The contacts 73, 71 and 74, 72 are in effect pairs of cooperating disconnect contacts. Where it is not required to adapt the combined switch-fuse-structure for use in a pre-existing installation of NEC fuses, other types of cooperating disconnect contacts, or connectors other than disconnect contacts, may be substituted for the particular type of disconnect contacts shown.

The mechanism illustrated in Figs. 9 and 11 lends itself particularly well to application in combination with cooperating pairs of disconnect contacts because springs 70 and the aforementioned striker pin biasing springs jointly operate as interlocks precluding reclosing of the relatively movable contacts of switch units 60, 61, 62 upon blowing of one or more of the current-limiting back-up fuses 4'. Therefore it is always safe upon blowing of any of the back-up fuses 4' of the composite switch-fuse-structure to separate the cooperating pairs of disconnect contacts 73, 71 and 74, 72, thus disconnecting the structure from the electric system into which it had been connected.

It will be understood that I have illustrated and described herein several preferred embodiments of my invention and that various alterations may be made in the details thereof without departing from the spirit and the scope of the invention as defined in the appended claims.

I claim as my invention:

1. In combination a substantially rectangular frame structure of insulating material; an automatic circuit interrupter supported by said frame structure, said interrupter including normally closed separable contact means spring biased to the open position thereof and overload responsive tripping means adapted to carry current; a current-limiting fuse adapted to blow only upon occurrence of major fault currents backing-up said interrupter also mounted on said frame structure said fuse including a fusible current carrying element in ribbon-form; striker pin means supported by said fuse and controlled by a fusible shunt across said fuse to trip said interrupter upon blowing of said fuse; a pair of blade type disconnect contacts arranged on and supported by said frame structure each adjacent to one of two parallel sides thereof, each of said pair of blade type contacts being adapted to cooperatively engage one of another pair of disconnect contacts arranged in spaced relation from said frame structure for connecting said interrupter into an electric circuit; a first conductor means for conductively connecting one of said separable contact means to one of said pair of blade type disconnect contacts; a second conductor means for conductively connecting another of said separable contact means to the other of said pair of blade type disconnect contacts, said second conductor means including said overload responsive tripping means and said fuse; and said overload responsive tripping means and said fuse being arranged on said frame structure within a space bounded on one side by said separable contact means and on the other side by said other of said pair of blade type disconnect contacts.

2. In combination a frame structure insulating material; an automatic circuit interrupter supported by said frame structure, said interrupter including separable contact means, spring means biasing said contact means to the open position thereof, a trip-free latch mechanism normally restraining said contact means in the closed position thereof, a flat bimetal strip normally engaged by one of the latch levers of said latch mechanism to restrain said latch mechanism, means for heating said bimetal strip to cause warping and disengagement thereof from said one of the latch levers of said latch mechanism, a handle adapted for manual operation of said contact means with said latch mechanism in latched position and means providing for a positive coupling between said handle and said latch mechanism to permit resetting of said latch mechanism by operation of said handle upon warping of said bimetal strip; a current-limiting fuse for backing-up said interrupter supported by said frame structure; striker pin means controlled by a fusible shunt across said fuse to become effective upon blowing of said fuse and fusion of said shunt to trip said interrupter, said striker pin means including a striker-pin-biasing spring and a striker pin proper arranged to strike against said bimetal strip under the bias of said striker-pin-biasing spring, and said spring having a stronger action than the spring action inherent in said bimetal strip to maintain said bimetal strip permanently out of engagement with said one of the latch levers upon operation of said striker pin means.

3. In combination a substantially rectangular frame structure of insulating material; an automatic circuit interrupter mounted on said frame structure, said interrupter including separable contact means, spring means biasing said contact means to the open position thereof, a trip-free latch mechanism comprising a first latch lever, a second latch lever supported by a trip-shaft and having a relatively short arm normally restraining said first latch lever and a relatively long arm, an overload tripping device including a normally flat bimetal strip arranged in a plane parallel to said trip-shaft and controlling said relatively long arm of said second latch lever, means associated with said bimetal strip for normally restraining said second latch lever in the latched position of said latch mechanism, a handle adapted for manual operation of said contact means with said latch mechanism in latched position, and means providing for a positive coupling between said handle and said latch mechanism when unlatched to permit resetting thereof by operation of said handle; a current-limiting back-up fuse for said interrupter mounted on said frame structure; striker pin means forming an integral part of said fuse controlled by a fusible shunt across said fuse to become effective upon fusion of said shunt, said striker pin means including a striker-pin-biasing spring and a striker pin proper arranged at right angles to said trip-shaft to unlatch said second latch element upon fusion of said shunt; a pair of electrical connectors mounted on said frame structure each adjacent to one of two parallel sides thereof for connecting said interrupter into an electric circuit; a first conductor means for conductively connecting one of said contact means to one of said pair of connectors; a second conductor means for conductively connecting another of said contact means to the other of said pair of connectors, and said second conductor means including said bimetal strip and said current-limiting fuse.

4. In combination a frame structure of insulating material; an automatic circuit interrupter supported by said frame structure, said interrupter comprising a pair of separable contacts, a spring biasing one of said pair of contacts to the open position thereof, a bimetal strip adapted to be serially connected with said pair of contacts into an electric circuit, and a manual operating mechanism for said one of said pair of contacts including a handle and a trip-free latch mechanism, said latch mechanism normally transmitting a component of the force of said spring situated in the plane of said bimetal strip to said bimetal strip to be normally restrained by said bimetal strip against the action of said spring, said handle and said latch mechanism being operatively related to cause closing of said pair of contacts when said handle is moved to an on-position and to cause opening of said pair of contacts when said handle is moved to an off-position and to cause said handle to assume an intermediate position in response to unlatching of said latch mechanism; a current-limiting fuse adapted to be serially connected into an electric circuit with said pair of contacts and with said bimetal strip mounted on said frame structure; a striker pin controlled by a fusible shunt across said fuse operative upon blowing of said fuse and fusion of said shunt; and means responsive to operation of said striker pin for causing disengagement of said bimetal strip and said latch mechanism.

5. In combination a substantially rectangular frame structure of insulating material; an automatic circuit interrupter comprising normally closed separable contact means spring biased to the open position thereof and current carrying overload responsive tripping means mounted on said frame structure; a current-limiting back-up fuse for said interrupter also mounted on said frame structure and including a current-carrying fusible means in ribbon form; a striker pin device forming an integral part of said fuse to trip said interrupter upon blowing of said fuse, said striker pin device including a fusible striker pin restraining wire in addition to said current carrying fusible means in ribbon form of said fuse; a first pair of disconnect contacts arranged on and supported by said frame structure each adjacent to one of two parallel sides thereof and each projecting in blade contact fashion away from said frame structure, each of said first pair of disconnect contacts being adapted to cooperatively engage one of a second pair of disconnect contacts arranged in spaced relation from said frame structure for connecting said interrupter into an electric circuit; a first conductor means for conductively connecting one of said separable contact means to one of said first pair of disconnect contacts; a second conductor means for conductively connecting another of said separable contact means to the other of said first pair of disconnect contacts, and said second conductor means including said current carrying tripping means and said fuse.

6. In combination a substantially rectangular frame structure of insulating material; an automatic circuit interrupter mounted on said frame structure, said interrupter including normally closed separable contact means, spring-bias means tending to move said contact means to the open position thereof, a latch mechanism having a pair of cooperating latching surfaces normally restraining said contact means in the closed position thereof, overload responsive tripping means adapted to carry current cooperating with said latch mechanism to permit separation of said contact means under the action of said spring-bias means, and a manual operator for operating said contact means with said latch mechanism in latched position; a current-limiting fuse adapted to blow only upon occurrence of major fault currents backing-up said interrupter mounted on said frame structure, said fuse including a fusible current-carrying element in ribbon form and spring biased striker pin means having a pin restraining wire, said fuse being arranged with the longitudinal axis thereof parallel to said pair of cooperating latching surfaces of said latch mechanism to trip said interrupter upon blowing of said fuse irrespective of the condition said tripping means is in; a first pair of disconnect contacts arranged on and supported by said frame structure each adjacent to one of two parallel sides thereof, each of said first pair of disconnect contacts projecting in blade contact fashion away from said frame structure and each of said first pair of disconnect contacts being adapted to cooperatively engage one of a second pair of disconnect contacts arranged in spaced relation from said frame structure for connecting said interrupter into an electric circuit; a first conductor means for conductively connecting one of said separable contact means to one of said first pair of disconnect contacts; a second conductor means for conductively connecting another of said separable contact means to the other of said first pair of disconnect contacts, said second conductor means including said overload responsive tripping means and said fuse; and said overload responsive tripping means and said fuse being arranged on said frame structure within a space bounded on one side by said separable contact means and on the other side by said other of said first pair of disconnect contacts.

7. In combination a substantially rectangular frame structure of insulating material; a pair of blade disconnect contacts arranged on and supported by said frame structure each adjacent to one of two parallel sides thereof, each of said pair of blade disconnect contacts being adapted to cooperatively engage one of a female pair of disconnect contacts arranged in spaced relation from said frame structure; an automatic circuit interrupter mounted on said frame structure, said interrupter including a fixed contact and a separable moving contact, a first conductor extending between one of said pair of blade disconnect contacts and said fixed contact, spring means biasing said moving contact to the open position thereof, a trip-free latch mechanism normally restraining said moving contact in the closed position thereof, said latch mechanism comprising a latch lever normally held in position by latch friction and movable out of position against the action of a predetermined spring bias thereby unlatching said latch mechanism, thermally responsive tripping means arranged to cause unlatching of said latch mechanism upon occurrence of an overload, a handle adapted for manual separation of said moving contact from said fixed contact with said latch mechanism in latched position, and means providing for a positive coupling between said handle and said latch mechanism to permit resetting of said latch mechanism by operation of said handle; a current-limiting fuse comprising fusible means in ribbon-form for backing-up said interrupter mounted on said frame structure; a second conductor extending between said fuse and the other of said pair of blade disconnect contacts; spring biased striker pin means supported by said fuse and controlled by a fusible shunt restraining wire across said fusible means in ribbon-form to trip said interrupter upon fusion of said fusible means in ribbon form and said shunt restraining wire, said striker pin means including a striker-pin-biasing spring and a striker pin proper arranged to strike against said latch lever of said latch mechanism under the action of said striker-pin-biasing spring; and said striker-pin-biasing spring having a stronger action than the action of said predetermined spring bias of said latch lever to preclude resetting of said latch mechanism by operation of said handle upon operation of said striker pin means.

8. In combination a substantially rectangular frame structure of insulating material; an automatic circuit interrupter supported by said frame structure, said interrupter including separable contact means, spring means biasing said contact means in the open position thereof, a trip-free latch mechanism normally restraining said contact means in the closed position thereof, said latch mechanism having a latch lever normally held in position by latch friction and movable out of position against the action of a predetermined spring bias thereby unlatching said latch mechanism, thermally responsive tripping means adapted to be heated by current to cause unlatching of said latch mechanism upon occurrence of an overload, a handle adapted for manual operation of said contact means with said latch mechanism in latched position, and means providing for a positive coupling between said handle and said latch mechanism to permit resetting of said latch mechanism by operation of said handle upon operation of said thermally responsive tripping means; a current-limiting fuse comprising a current carrying fusible means in ribbon-form for backing-up said circuit interrupter supported by said frame structure; striker pin means supported by said fuse and controlled by a fusible shunt across said fuse to become effective upon blowing of said fuse, said striker pin means including a striker-pin-biasing spring and a striker pin proper arranged to strike against said latch lever of said latch mechanism under the action of said striker-pin-biasing spring, said striker-pin-biasing spring having a stronger action than the action of said predetermined spring bias of said latch lever of said latch mechanism to preclude resetting of said latch mechanism by the action of said handle upon operation of said striker pin means; a pair of blade disconnect contacts arranged on and supported by said frame structure each adjacent to one of two parallel sides thereof, each of said pair of blade contacts being adapted to cooperatively engage one of a female pair of disconnect contacts arranged in spaced relation from said frame structure for connecting said circuit interrupter into an electric circuit; a first conductor means for conductively connecting one of said separable contact means to one of said pair of blade disconnect contacts; a second conductor means for conductively connecting another of said separable contact means to the other of said pair of blade disconnect contacts, and said second conductor means including said thermally responsive tripping means and said fuse.

9. In combination a substantially rectangular frame structure of insulating material; an automatic circuit interrupter mounted on said frame structure, said interrupter including separable contact means, spring means biasing said contact means to the open position thereof, a trip-free latch mechanism having a trip-shaft and a rocking latch element mounted on said trip-shaft, an overload tripping device including a normally flat bimetal strip arranged in a plane parallel to said trip-shaft, means associated with said bimetal strip for normally restraining said latch element in the latched position of said latch mechanism, a handle adapted for manual operation of said contact means with said latch mechanism in latched position, and means providing for a positive coupling between said handle and said latch mechanism when unlatched to permit resetting thereof by operation of said handle; a current-limiting back-up fuse for said interrupter mounted on said frame structure, said fuse comprising a current carrying fusible means in ribbon form; striker pin means forming an integral part of said fuse and controlled by a fusible shunt across said fuse to become effective upon fusion of said shunt, said striker pin means including a striker-pin-biasing spring and a striker pin proper arranged at right angles to said trip-shaft to unlatch said latching mechanism upon fusion of said shunt; a pair of blade disconnecting contacts mounted on said frame structure each adjacent to one of two parallel sides thereof, each of said pair of blade disconnect contacts being adapted to cooperatively engage one of a female pair of disconnect contacts arranged in spaced relation from said frame structure for connecting said interrupter into an electric circuit; a first conductor means for conductively connecting one of said separable contact means to one of said pair of blade disconnect contacts; a second conductor means for conductively connecting another of said separable contact means to the other of said pair of blade disconnect contacts, and said second conductor means including said bimetal strip and said fuse.

10. In combination a multipolar automatic circuit interrupter having a common tripping mechanism for all the poles thereof to effect simultaneous interruption of all the phases of a multiphase circuit into which said interrupter is inserted, a plurality of current-limiting back-up fuses for said interrupter each associated with one pole thereof, a common frame structure of insulating material supporting said interrupter and said plurality of fuses, a plurality of pairs of cooperating disconnect contacts associated with said frame structure adapted for joint insertion of said interrupter and said plurality of fuses into and joint disconnection of said interrupter and of said plurality of fuses from an electric multiphase circuit, each of said plurality of pairs of disconnect contacts comprising a male contact secured to said common frame structure and projecting in blade contact fashion away from said common frame structure and each of said plurality of pairs of disconnect contacts comprising a female contact spaced from said common frame structure and adapted to be engaged by said male contact, a plurality of striker pin devices each associated with one of said plurality of fuses and each responsive to blowing of one of said plurality of fuses to operate said common tripping mechanism of said interrupter, and spring means associated with each of said plurality of striker pin devices adapted to preclude reclosing of said interrupter upon operation of any of said plurality of striker pin devices.

References Cited in the file of this patent

UNITED STATES PATENTS

| | | |
|---|---|---|
| 997,838 | Leeper | July 11, 1911 |
| 1,159,547 | Tate | Nov. 9, 1915 |
| 1,192,974 | Anderson | Aug. 1, 1916 |
| 2,345,105 | Dorfman et al. | Mar. 28, 1944 |
| 2,376,789 | Leonard | May 22, 1945 |
| 2,385,658 | Strang et al. | Sept. 25, 1945 |
| 2,405,929 | Wald | Aug. 13, 1946 |
| 2,443,090 | Wise | June 8, 1948 |
| 2,473,196 | Dannenberg | July 14, 1949 |
| 2,476,236 | Buckley | July 12, 1949 |
| 2,539,567 | Best | Jan. 30, 1951 |
| 2,548,617 | Purpura | Apr. 10, 1951 |
| 2,740,735 | Swain | Apr. 3, 1956 |
| 2,794,095 | Kozacka | May 28, 1957 |
| 2,843,702 | Edmunds | July 15, 1958 |

FOREIGN PATENTS

| | | |
|---|---|---|
| 370,092 | Great Britain | Apr. 7, 1932 |

UNITED STATES PATENT OFFICE
CERTIFICATE OF CORRECTION

Patent No. 2,911,502                                                November 3, 1959

William S. Edsall

It is hereby certified that error appears in the printed specification of the above numbered patent requiring correction and that the said Letters Patent should read as corrected below.

Column 7, line 17, for "accouna" read -- account --; column 8, line 55, for "6a" read -- 6 --; column 9, line 13, after "6" insert -- , 6a --.

Signed and sealed this 24th day of May 1960.

(SEAL)
Attest:

KARL H. AXLINE                                          ROBERT C. WATSON
Attesting Officer                                      Commissioner of Patents